US005477678A

United States Patent [19]

Shirai et al.

[11] Patent Number: 5,477,678

[45] Date of Patent: Dec. 26, 1995

[54] HYDRAULIC CIRCUIT SYSTEM

[75] Inventors: Kiyoshi Shirai; Terruo Akiyama; Shigeru Shinohara; Naoki Ishizaki; Takahide Takiguchi, all of Kawasaki, Japan

[73] Assignee: Kabushiki Kaisha Komatsu Seisakusho, Tokyo, Japan

[21] Appl. No.: 839,664

[22] PCT Filed: June 26, 1990

[86] PCT No.: PCT/JP90/00830

§ 371 Date: Feb. 25, 1991

§ 102(e) Date: Feb. 25, 1991

[87] PCT Pub. No.: WO/91/00432

PCT Pub. Date: Jan. 10, 1991

Related U.S. Application Data

[63] Continuation of Ser. No. 651,372, Feb. 25, 1991.

[30] Foreign Application Priority Data

Jun. 26, 1989 [JP] Japan .................................. 1-160874
Jun. 26, 1989 [JP] Japan .................................. 1-160875

[51] Int. Cl.$^6$ .................................................... F16D 31/02

[52] U.S. Cl. ............................................. 60/426; 91/517

[58] Field of Search ...................... 60/426, 427; 91/461, 91/517, 0.02; 137/596.2

[56] References Cited

U.S. PATENT DOCUMENTS

| | | | |
|---|---|---|---|
| 3,414,017 | 12/1968 | Hodgson | 137/596.2 |
| 4,693,272 | 9/1987 | Wilke | 60/452 |
| 4,986,071 | 1/1991 | Voss et al. | 60/450 |

FOREIGN PATENT DOCUMENTS

| | | |
|---|---|---|
| 58-117140 | 7/1983 | Japan . |
| 60-22201 | 5/1985 | Japan . |
| 63-176803 | 7/1988 | Japan . |
| 1-153802 | 6/1989 | Japan . |

OTHER PUBLICATIONS

Pippenger, Fluid–Power Controls, McGraw–Hill Book Co., Inc., copyrighted 1959, p. 75.

*Primary Examiner*—F. Daniel Lopez
*Attorney, Agent, or Firm*—Armstrong, Westerman, Hattori, McLeland & Naughton

[57] ABSTRACT

In a hydraulic circuit system, when pressurized oil discharged from a single hydraulic pump is supplied to a plurality of actuators: the pressurized oil is supplied to heavily-loaded ones of the actuators at gradually reducing flow rates to reduce a shock, while supplied to lightly-loaded ones of the actuators at gradually increasing flow rates to increase working speeds of these lightly-loaded actuators. The hydraulic circuit system comprises a plurality of directional control valves (2) one of which is provided with pressure-compensated flow control valves (18) each of which is provided with a load lead-in passage having a restriction means (R). In addition, further comprised in the system are: relief valves (22, 22) for relieving the pressurized oil under the influence of load pressure of the actuators (3) operated by the directional control valves (2); a restriction orifice (24) provided in a drain side of each of the relief valves so as to produce pressure therein.

4 Claims, 2 Drawing Sheets

HYDRAULIC CIRCUIT SYSTEM

This application is a continuation division of application Ser. No. 651,372 filed Feb. 25, 1991.

FIELD OF THE INVENTION

The present invention relates to a hydraulic circuit system for supplying pressurized oil to a plurality of hydraulic actuators.

DESCRIPTION OF THE PRIOR ART

Heretofore, it is well known that a plurality of closed-center type directional control valves are provided in a pressurized oil discharge line or passage of a single hydraulic pump employed in a hydraulic circuit system so as to supply pressurized oil (which is discharged from the single hydraulic pump) to a plurality of hydraulic actuators through the directional control valves.

In the hydraulic circuit system having the above construction, when the plurality of the directional control valves are simultaneously operated, the pressurized oil discharged from the single pump is supplied only to lightly-loaded ones of the actuators. In the conventional hydraulic circuit system, this problem is resolved as hereinafter described.

In, the conventional hydraulic circuit system, a pressure-compensated flow control valve is provided in a connecting circuit interposed between each of the directional control valves and each of the actuators. In operation, the pressure set point of each of the pressure-compensated flow control valves substantially corresponds to the highest one of load pressures of each of the actuators to enable the single hydraulic pump to supply its discharged pressurized oil to the plurality of the actuators (which are different in load pressure with each other) even when the plurality of the directional control valves are simultaneously operated.

That is, in the conventional hydraulic circuit system having the above construction, when the plurality of the directional control valves are simultaneously operated, each of the pressure-compensated flow control valves is set at the highest one of the load pressures of each of the actuators, thereby permitting the single hydraulic pump to supply or deliver its discharged pressurized oil to each of the actuators at a flow rate depending on a valve-opening ratio of each of the directional control valves.

However, in the above conventional hydraulic circuit system, in a condition in which the pressurized oil discharged from the pump is supplied to only one (hereafter referred to as the first actuator) of the actuators through one of the directional control valve, when the pressurized oil is supplied to the remaining actuators through the remaining directional control valves, each of the pressure-compensated flow control valves is immediately set at a load pressure of each of the actuators to have the pump deliver its discharged pressurized oil to each of the actuators at a flow ratio depending on a valve-opening ratio of each of the directional control valves. As a result, the flow rate of the pressurized oil delivered to the first actuator suddenly decreases so that a working speed of the first actuator is also suddenly lowered to administer a shock to a load.

For example, in a hydraulic circuit system employed in a power shovel machine having a single hydraulic pump for supplying pressurized oil to: a hydraulic motor used for traveling in the machine; a boom hydraulic cylinder; and an arm hydraulic cylinder, the pressurized oil discharged from the pump is supplied to the motor used for traveling in the machine by operating one of directional control valves employed in the hydraulic circuit system. Under such circumstances, when the pressurized oil discharged from the pump is supplied to the boom cylinder and the arm cylinder too by operating the remaining directional control valves, a flow rate of the pressurized oil supplied to the motor used for traveling is suddenly reduced in order to administer a shock to the machine in traveling.

As is in the above, in case that the directional control valves are simultaneously shifted from their neutral positions to their operating positions by means of pilot pressures, each of the directional control valves has the same change over stroke, and, therefore has the same valve opening area. Consequently, each of the actuators receives the pressurized oil at the same flow rate. That is, e.g., in the case where one of two actuators only supports its load, and, therefore does not move it in a condition in which the other of the actuators moves its load, the pressurized oil supplied to the one of the actuators is merely wasted, whereas the pressurized oil supplied to the other of the actuators lacks in flow rate to lower the workings speed of the other of the actuators.

Namely, for example, in the power shovel machine wherein one of the actuators forms a swing motor of the machine, and the other of the actuators forms a boom hydraulic cylinder of the machine, whereby the power shovel machine swingably moves its bucket up and down to cut a side wall of a trench in a condition in which the bucket is pressed against the side wall of the trench, the swing motor swingably drives an upper vehicle body of the shovel machine in a horizontal plane so as to press the bucket against the side wall of the trench. In the operation under such circumstances, the boom hydraulic cylinder of the shovel machine swingably moves its boom up and down in a vertical plane, thereby permitting the bucket to cut the side wall of the trench. In such a cutting operation, since the swing motor of the shovel machine is not turned after the bucket is brought into contact with the side wall of the trench, the pressurized oil is substantially not supplied to the swing motor in a condition in which the swing motor only has the bucket press against the side wall of the trench. In contrast with this, during the above cutting operation, since it is necessary for the boom hydraulic cylinder of the shovel machine to swiftly move the bucket up and down, the pressurized oil must be supplied to the boom hydraulic cylinder at a considerable flow rate. However, since there is no difference in the valve opening area of the directional control valves, the pressurized oil is supplied to each of the swing motor and the boom hydraulic cylinder at the same flow rate. As a result, the pressurized oil supplied to the swing motor is wasted thereon, whereas the flow rate of the pressurized oil supplied to the boom hydraulic cylinder is deficient.

SUMMARY OF THE INVENTION

Under such circumstances, the present invention was made. Therefore, it is a first object of the present invention to provide a hydraulic circuit system for supplying pressurized oil to a plurality of hydraulic actuators, in which hydraulic circuit system a restriction means is provided in a load pressure lead-in passage of each of pressure-compensated flow control valves provided in each of a plurality of directional control valves which control the actuators, thereby permitting a setting pressure of each of the pressure-compensated flow control valves to gradually increases.

It is a second object of the present invention to provide a hydraulic circuit system for supplying pressurized oil to a plurality of hydraulic actuators, in which hydraulic circuit system: a restriction means is provided in a load pressure lead-in passage of each of pressure-compensated flow control valves provided in each of a plurality of directional control valves which control the actuators; and a relief valve, which is operated by a load pressure of each of the actuators, is provided in each of a first and a second port each of which ports communicates with each of pressure chambers of the actuator; and a restriction means is provided in a drain side of each of the relief valves to produce pressure causing the directional control valve to reduce its valve opening area.

The above objects of the present invention are accomplished by providing, in accordance with a first aspect of the present invention which is hereinafter described.

In a hydraulic circuit system comprising: a plurality of closed-center type directional control valves; and a plurality off pressure-compensated flow control valves each of which is provided in a connecting circuit interposed between each of the directional control valves and each of a plurality of hydraulic actuators each of which is controlled by each of the directional control valves in operation, each of the pressure-compensated flow control valves being set at a setting pressure corresponding to the highest one of load pressures of each of the hydraulic actuators.

The improvement of the hydraulic circuit system of this invention is directed to a restriction means which is provided in a load pressure: lead-in passage of each of the pressure-compensated flow control valves, wherein each of the pressure-compensated flow control valves is provided in each of the plurality of the directional control valves.

In addition, the above objects of the present invention are accomplished by providing, in accordance with a second aspect of the present invention which is hereinafter described.

The hydraulic circuit system as set forth in the first aspect of the present invention which further comprises:

a pair of relief valves which are provided in a first and a second port respectively, the first and the second port being in communication with pressure chambers of each of the hydraulic actuators to permit each of the relief valves to relieve pressurized fluid under the influence of load pressures of each of the hydraulic actuators controlled by the directional control valves; and another restriction means provided in a drain side of each of the relief valves to produce pressure therein;

whereby each of the directional control valves reduces its valve opening area under the influence of the pressure produced in the drain side of each of the relief valves.

In accordance with the first and the second aspect of the present invention described above, it is possible to advantageously reduce a shock in operation: namely, in a condition in which a hydraulic pump supplies pressurized fluid or oil to only a first one of the actuators by operating a first one of the directional control valves, when another one of the directional control valves is operated, another one of the actuators gradually leads its load pressure into a pressure-compensated flow control valve provided in the first one of the directional control valves to cause the setting pressure of the pressure-compensated flow control valve to gradually increase. As a result, the flow rate of the pressurized oil supplied to the first one of the actuators gradually decreases in order to gradually lower a working speed of the first one of the actuators so that the shock is substantially removed.

On the other hand, when the load pressure of the first one of the actuators to which the pressurized oil is supplied through the first one of the directional control valves increases, the relief valves of the first one of the directional control valves relieves the pressurized oil to produce a pressure in the drain sides of the relief valves. Under the influence of such pressure produced in the drain sides of the relief valves, the valve opening area of the first one of the directional control valve is reduced. Consequently, when the plurality of the directional control valves are simultaneously operated, the first one of the directional control valves which is connected with the highly-loaded first one of the actuators is smaller in valve opening area than any other ones of the directional control valves connected with other ones of the actuators. As a result, the flow rate of the pressurized oil supplied from the first one of the directional control valves to the first one of the actuators reduces, whereas the flow rate of the pressurized oil supplied from the other ones of the directional control valves to the other ones of the actuators increases. Consequently, in a condition in which the first one of the actuators merely supports its load not to move it while the other ones of the actuators move their loads, the flow rate of the pressurized oil supplied to the first one of the actuators reduces and the flow rate of the pressurized oil supplied to the other ones of the actuators increase to advantageously increase the working speeds of the other ones of the actuators.

The above objects, additional objects, additional aspects and advantages of the present invention will be clarified to those skilled in the art hereinbelow with reference to the following description and accompanying drawings illustrating preferred embodiments of the present invention according to principles of the present invention.

DESCRIPTION OF THE PREFERRED EMBODIMENTS

Hereinbelow, preferred embodiments of the present invention will be described in detail with reference to the accompanying drawings.

Figure 1:
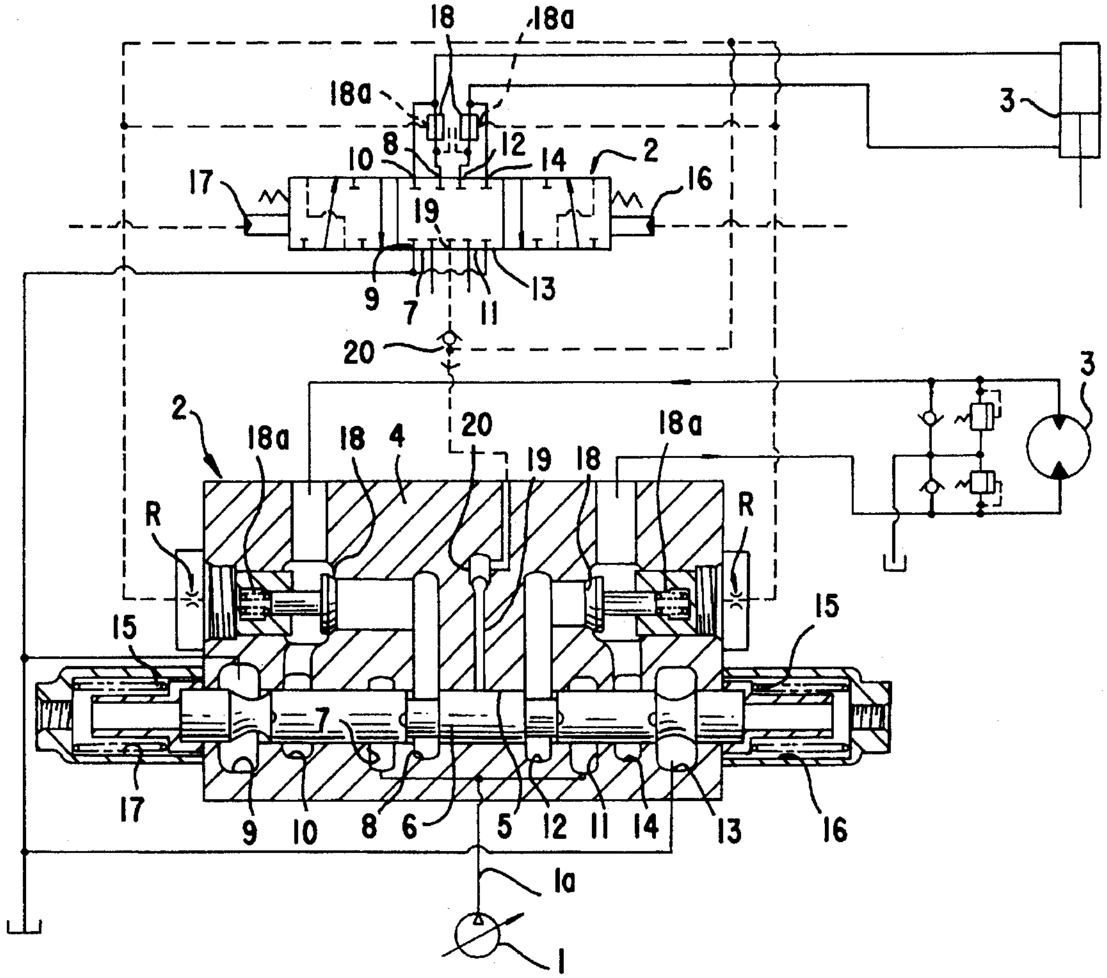
FIG. 1 is a schematic diagram of a hydraulic circuit of a first embodiment of the present invention.

As shown FIG. 1, a plurality off directional control valves 2 are provided in a discharge line or passage 1*a* of a hydraulic pump 1, so that pressurized oil discharged from the pump 1 is supplied to a pair of hydraulic actuators 2 by operating the directional control valves 2.

Incidentally, in a first embodiment of the present invention shown in FIG. 1, one of the actuators 3 forms a hydraulic motor used for traveling in a power shovel machine, and the other of the actuators 3 forms a boom hydraulic cylinder of the power shovel machine a boom member of which is swingably moved up and down by the cylinder in operation.

Each of the directional control valves 2 is provided with a valve body 4 forming a spool hole 5 in which is slidably received a spool 6 through which communication of pressurized fluid or oil from a first pump port 7, a first reservoir port 9, a second pump port 11 and a second reservoir port 13 to a first outlet port 8, a first port 10, a second outlet port 12 and a second port 14 respectively is permitted and blocked off. In each of the directional control valves 2, the spool 6 is normally held in its neutral position by a spring 15 so as to block off the above communication of the pressurized oil. In operation, under the influence of a pilot pressure supplied to a first pressure chamber 16 of the directional control valve 2, the spool 6 is moved to the left as viewed in FIG. 1 so as to be held in its first operating position in which: the first pump port 7 communicates with the first outlet port 8; and the second port 14 communicates with the second reservoir port 13, respectively. On the other hand, under the influence of another pilot pressure supplied to a second pressure chamber 17 of the directional control valve 2, the spool 6 is moved to the right as viewed in FIG. 1 so as to be held in its second operating position in which: the second pump port 11 communicates with the second outlet port 12; the first port 10 communicates with the first reservoir port 9; the first outlet port 8 communicates with the first port 10 through a pressure-compensated flow control valve 18; the second outlet port 12 communicates with the second port 14 through another pressure-compensated flow control valve 18, respectively. At this time, in each of the directional control valves 2, pressure of the pressurized oil received in the first outlet port 8 or the second outlet port 12 is detected through a drill hole (not shown) formed in the spool 6 and a detecting hole 19. These pressures thus detected in a pair of the directional control valves 2 are compared with each other in shuttle valves 20 formed in the directional control valves 2 so that a higher one of the thus compared pressures is supplied to a spring chamber 18*a* of each of pressure-compensated flow control valves 18, whereby each of the pressure-compensated flow control valves 18 is set at a pressure corresponding to such higher one of the thus compared pressures, thereby permitting each of the pressure-compensated flow control valves 18 to be set at a pressure corresponding to the highest one of load pressures when the plurality of the directional control valves 2 are simultaneously operated. As a result, the single hydraulic pump 1 can supply the pressurized oil to the plurality of the hydraulic actuators 3 which are different in load pressure from each other.

A restriction means R is provided in a load pressure lead-in circuit off each of the pressure-compensated flow control valves 18 provided in one of the directional control valves 2, which one is used for supplying the pressure oil to one of the actuators 3, (such as a hydraulic motor used for traveling in the power shovel machine) so that load pressures supplied to the spring chambers 18*a* of the pressure-compensated flow control valves 18 are prevented from varying at a drastic rate.

Figure 2:
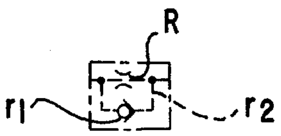
FIG. 2 is a modified embodiment of a restriction means employed in the hydraulic circuit of the first embodiment of the present invention shown in FIG. 1.

Incidentally, it is possible to employ the following construction: namely, as shown in FIG. 2, a bypass passage $r_2$ provided with a check valve $r_1$ is connected with the restriction means R in parallel therewith so as to permit the pressurized oil to smoothly flow from the spring chamber 18*a* to the shuttle valve 20, and to prevent a load pressure from being supplied to the spring chamber 18*a* at a drastic rate.

In other words, it is possible to gradually increase the setting pressure of the pressure-compensated flow control valve 18 by preventing the load pressure from being supplied to the spring chamber 18*a* of the pressure-compensated flow control valve 18 at a drastic rate.

As described above, in a condition in which the hydraulic pump 1 supplies the pressurized oil to one of the actuators 3, (such as the hydraulic motor used for traveling in the power shovel machine) through one of the directional control valves 2 in operation, when another one of the directional control valves 2 is operated to supply the pressurized oil discharged from the pump 1 to another one of the actuators 3 (such as the boom hydraulic cylinder of the power shovel machine) a load pressure of the boom hydraulic cylinder is gradually supplied to the spring chamber 18*a* of the pressure-compensated flow control valve 18 so as to gradually increase the setting pressure of the pressure-compensated flow control valve, so that the pressurized oil is supplied from this directional control valve 2 to the boom hydraulic cylinder at a moderate rate, whereby the pressurized oil supplied to the hydraulic motor used for traveling in the power shovel machine decreases at a moderate rate to moderately decelerate the power shovel machine in traveling, thereby permitting the machine to decrease its traveling speed without experiencing any shock.

Now, with reference to FIG. 3, a second embodiment of the present invention will be described in detail.

Figure 3:
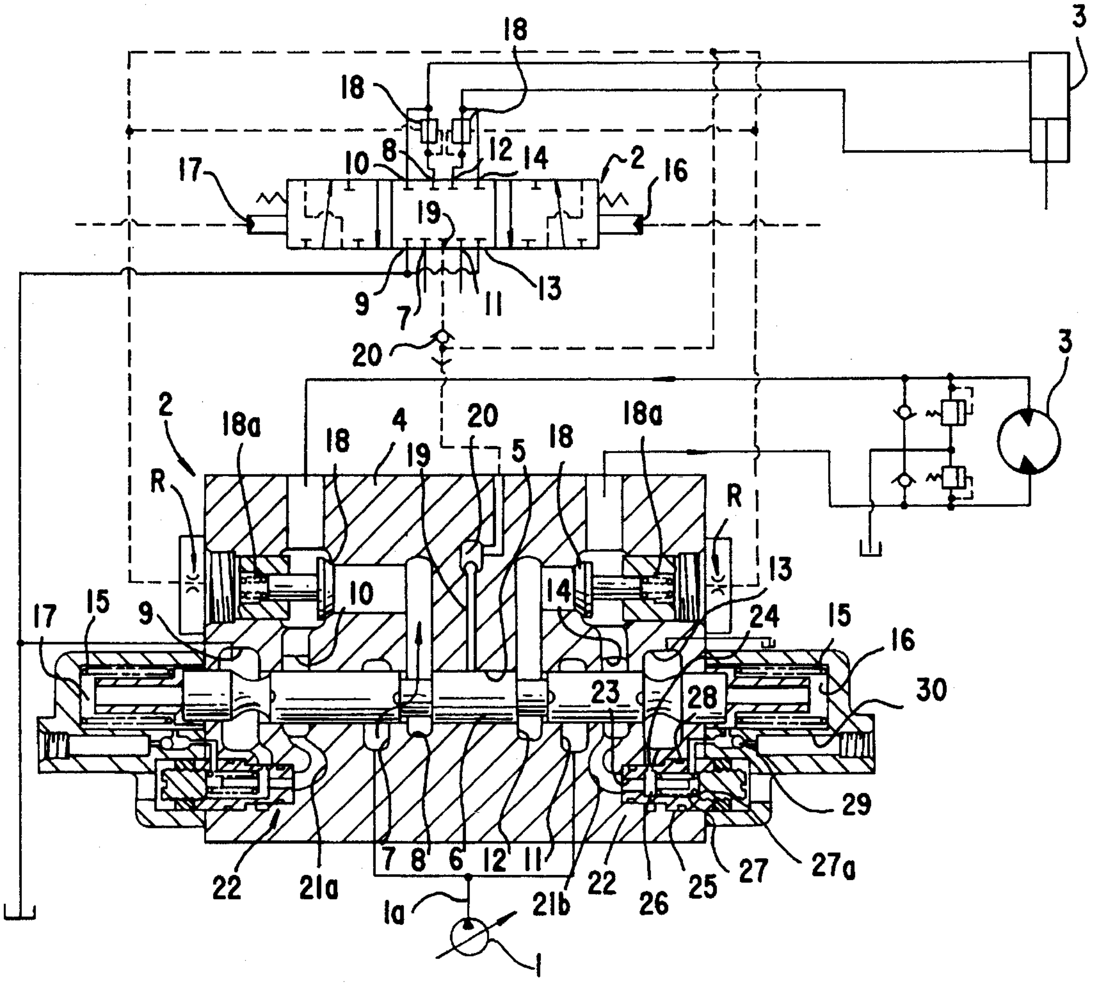
FIG. 3 is a schematic diagram of a hydraulic circuit of a second embodiment of the present invention.

As for the second embodiment of the present invention shown in FIG. 3, its parts denoted by the same reference numerals as those employed in the first embodiment of the present invention shown in FIGS. 1 and 2 have the same constructions as those of the parts of the first embodiment. Consequently, in order to avoid redundancy in description, these parts of the second embodiment of the present invention, which are denoted by the same reference numerals as those of the pants of the first embodiment of the present invention will not be described hereinbelow.

Formed in the valve body 4 of the second embodiment of the present invention are: a first oil port $21_a$ through which the first port 10 communicates with the first reservoir port 9; and a second oil port $21_b$ through which the second port 14 communicates with the second reservoir port 13, respectively. A relief valve 22 is provided in each of the first oil port $21_a$ and the second oil port $21_b$.

In the relief valve 22, a poppet valve 26 is slidably mounted in a sleeve-lime main body 25 provided with an inlet port 23 and a restriction orifice 24, while resiliently held against an opening of seat of the inlet port 23 by a spring 27 to block off communication of pressurized oil from the inlet port 23 to the restriction orifice 24. The inlet port 23 communicates with the first port 10 or the second port 14. On the other hand, the restriction orifice 24 communicates with the second reservoir port 13 or the first reservoir port 9. A spring chamber 27*a* of the relief valve 22 communicates with the first pressure-chamber 16 or the second pressure chamber 17 through a port 28 and a shuttle valve 29.

Incidentally, in the shuttle valve 29, as soon as pressure is applied at the port 28, a ball element of the shuttle valve 29 will move over to an inlet port 30 to close it off, and leave the connection from the port 28 to the first pressure chamber 16 or the second pressure chamber 17 open to supply the pressurized oil thereto, as shown in FIG. 3. Similarly, when pressure is applied at the inlet port 30, the ball element will move over to the port 28 to close it off, and leave the connection from the inlet port 30 to the first pressure chamber 16 or the second pressure chamber 17 open to supply the pressurized oil thereto.

In this second embodiment of the present invention shown in FIG. 3, in case that the pilot pressure is applied to the first pressure chamber 16 of each of the directional control valves 2 to move the spool to the left, thereby permitting the spool to be held at its first operating position to supply the pressurized oil discharged from the pump 1 to each of the actuators 3, since each of the pressure-compensated flow control valves 18 is set at a pressure corresponding to the highest one of load pressures which are supplied to the pressure chamber 18*a* of each of the pressure-compensated flow control valves 18 through the shuttle valve 20, it is possible to supply, without any trouble, the pressurized oil discharged from the single hydraulic pump 1 to each of the actuators 3 which are different in load pressure from each other. In addition, it is also possible to supply the pressurized oil to each of the actuators at the same flow rate, because the pressurized oil is distributed to each of the actuators at a rate corresponding to the valve opening area of each of the directional control valves (i.e., at a flow rate corresponding to a ratio) in communication area, of the first pump port 7 to the first outlet port 8, and there is no difference in stroke of the spool 6 and communication area between the the directional control valves 2.

At this time, as is in the above case, in case that the hydraulic motor used for traveling in the power shovel machine is not turned to merely hold a load in a stationary condition while the boom hydraulic cylinder is extended in operation, a pressure of the pressurized oil received in the first port 10 of one of the directional control valves 2 increases and applies the pressure of pressurized oil to the relief valve 22 through the first oil port **21*a* to unseat the poppet valve 26 of the relief valve 22, thereby permitting the pressurized oil to flow into the first reservoir port 9 through the restriction orifice 24. As a result, since pressure is increased upstream of the restriction orifice 24, the thus increased pressure is supplied to the second pressure chamber 17 through the spring chamber 27*a*, port 28 and the shuttle valve 29 to move the spool 6** to the right.

Consequently, the first pump port 7 and the first outlet port 8 off one off the directional control valves 2 reduce their communication areas so as to: reduce the flow rate off the pressurized oil supplied to the motor used for traveling, and increase the flow rate off the pressurized oil supplied to the boom hydraulic cylinder.

While the invention has been particularly shown and described in reference to preferred embodiments thereof, it will be understood by those skilled in the art that changes in form and details may be made therein without departing from the spirit and scope of the invention.

We claim:

1. A hydraulic circuit system, comprising:

a plurality of hydraulic actuators;

a plurality of closed-center type directional control valve means;

a plurality of pressure-compensated flow control valve means each being in a connecting circuit interposed between each of said directional control valve means and each of said plurality of hydraulic actuators and active for distributing hydraulic pressure to a corresponding hydraulic actuator, each being controlled by each of said directional control valve means in operation, pressure of each of said pressure-compensated flow control valve means being set at a setting pressure corresponding to a highest one of load pressures of each of said hydraulic actuators; and a restriction means provided in a load pressure lead-in passage of each of said pressure-compensated flow control valve means, each of said pressure-compensated flow control valve means being interposed between one of said plurality of said directional control valve means and one of said plurality of hydraulic actuators, for adjusting the rate of change of the pressure to be set in said pressure-compensated flow control valve means and for avoiding abrupt variation of the pressure in said hydraulic actuators.

2. A hydraulic circuit system comprising:

a plurality of hydraulic actuators;

a plurality of closed-center type directional control valves;

a plurality of pressure-compensated flow control valves, each being in connecting circuit interposed between each of said directional control valves and each of said plurality of hydraulic actuators, each being controlled by each of said directional control valves in operation, pressure of each of said pressure-compensated flow control valves being set at a setting pressure corresponding to a highest one of load pressures of each of said hydraulic actuators;

a restriction means provided in a load pressure lead-in passage of each of said pressure-compensated flow control valves, each of said pressure-compensated flow control valves being interposed between one of said plurality of said directional control valves and one of said plurality of hydraulic actuators;

a pair of relief valves provided in a first port and a second port, respectively, said first and second ports being in communication with pressure chambers of said hydraulic actuators to permit each of said relief valves to relieve pressurized fluid under the influence of load pressures of each of said hydraulic actuators controlled by said directional control valves; and another restriction means for producing a pressure in a drain side of each of said relief valves, wherein each of said directional control valves reduces its valve opening area under the influence of said pressure produced in said drain side of each of said relief valves.

3. A hydraulic circuit system, comprising:

a plurality of hydraulic actuators;

a plurality of closed-center type directional control valve means;

a plurality of pressure-compensated flow control valve means, each being in a connecting circuit interposed between each of said directional control valve means and each of said plurality of hydraulic actuators and active for distributing hydraulic pressure to a corresponding hydraulic actuator, each being controlled by each of said directional control valve means in operation, pressure of each of said pressure-compensated flow control valve means being set at a setting pressure corresponding to a highest one of load pressures of each of said hydraulic actuators; and a restriction means provided in a load pressure lead-in passage of each of said pressure-compensated flow control valve means, each of said pressure-compensated flow control valve means being interposed between one of said plurality of said directional control valve means and one of said plurality of hydraulic actuators, for restricting flow rate to be lead in associated with one of said pressure-compensated flow control valve means for moderate variation of pressure distribution for respective hydraulic actuators in action.

4. A hydraulic circuit system, comprising:

a plurality of hydraulic actuators;

a plurality of closed-center type directional control valves;

a plurality of pressure-compensated flow control valves incorporated in each of a plurality of operating valve assemblies, each being in a connecting circuit interposed between each of said directional control valves and each of said plurality of hydraulic actuators, each being controlled by each of said directional control valves in operation, pressure of each of said pressure-compensated flow control valves being set at a setting pressure corresponding to a highest one of load pressures of each of said hydraulic actuators;

a restriction means provided in a load pressure lead-in passage of each of said pressure-compensated flow control valves, each of said pressure-compensated valves being in one of said plurality of said operating valve assemblies, for restricting behavior of said pressure-compensated flow control valve for preventing abrupt motion of said pressure-compensated flow control valve;

a drain means responsive to the load pressure on said actuator for relieving pressure in said operating valve assembly; and a flow restriction means provided in a drain path of said drain means for restricting fluid flow therethrough to produce a fluid pressure for varying the path area of said operating valve assembly.

* * * * *